(12) United States Patent
Burns et al.

(10) Patent No.: US 8,055,094 B2
(45) Date of Patent: Nov. 8, 2011

(54) APPARATUS AND METHOD OF MOTION ADAPTIVE IMAGE PROCESSING

(75) Inventors: James Edward Burns, Basingstoke (GB); Karl James Sharman, Eastleigh (GB); Nicholas Ian Saunders, Basingstoke (GB); Robert Mark Stefan Porter, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 1008 days.

(21) Appl. No.: 11/949,471

(22) Filed: Dec. 3, 2007

(65) Prior Publication Data

US 2008/0175440 A1      Jul. 24, 2008

(30) Foreign Application Priority Data

Dec. 6, 2006   (GB) .................................. 0624409.9

(51) Int. Cl.
   *G06K 9/00* (2006.01)
   *G06K 9/36* (2006.01)
(52) U.S. Cl. ........................................ 382/276; 382/103
(58) Field of Classification Search .......... 382/262–264, 382/266, 284, 298–300; 348/448, 451, 452, 348/699–701, 910, 620
See application file for complete search history.

(56) References Cited

U.S. PATENT DOCUMENTS

| | | | |
|---|---|---|---|
| 4,924,305 A | 5/1990 | Nakagawa et al. | |
| 5,959,681 A * | 9/1999 | Cho | 348/452 |
| 6,580,470 B1 * | 6/2003 | Eckersley et al. | 348/771 |
| 7,154,556 B1 * | 12/2006 | Wang et al. | 348/452 |
| 7,193,655 B2 * | 3/2007 | Nicolas | 348/448 |
| 7,268,791 B1 * | 9/2007 | Jannink | 345/619 |
| 7,321,396 B2 * | 1/2008 | Jung et al. | 348/452 |

(Continued)

FOREIGN PATENT DOCUMENTS

CN      1158052 A      8/1997

(Continued)

OTHER PUBLICATIONS

Yu-Lin Chang; Shyh-Feng Lin; Ching-Yeh Chen; Liang-Gee Chen; , "Video de-interlacing by adaptive 4-field global/local motion compensated approach," Circuits and Systems for Video Technology, IEEE Transactions on , vol. 15, No. 12, pp. 1569-1582, Dec. 2005.*

*Primary Examiner* — Gregory M Desire
*Assistant Examiner* — Andrae S Allison
(74) *Attorney, Agent, or Firm* — Oblon, Spivak, McClelland, Maier & Neustadt, L.L.P.

(57) ABSTRACT

An image processing apparatus includes a first motion detector, a second motion detector and a conversion selector. The first motion detector detects motion to a first level of spatial frequency sensitivity. The second motion detector detects motion to a second level of spatial frequency sensitivity greater than the first level of spatial frequency sensitivity to detect smaller amounts of motion than the first motion detector. The conversion selector selects contributions from at least one of a first conversion process and a second conversion process for a given point in an image dependant upon whether motion is detected by the first motion detector at the given point or not. The conversion selector operates independently of the second motion detector if a degree of motion within the image or a part thereof including the given point detected by the first motion detector does not exceed a threshold amount.

19 Claims, 13 Drawing Sheets

| U.S. PATENT DOCUMENTS | | | | |
|---|---|---|---|---|
| 7,525,599 B2 * | 4/2009 | MacInnis et al. | | 348/448 |
| 7,542,095 B2 * | 6/2009 | Zhou et al. | | 348/452 |
| 7,561,210 B2 * | 7/2009 | Lee | | 348/701 |
| 7,773,151 B2 * | 8/2010 | Barnichon | | 348/448 |
| 7,864,246 B2 * | 1/2011 | MacInnis | | 348/448 |
| 7,907,210 B2 * | 3/2011 | Lu et al. | | 348/452 |
| 2005/0036063 A1 * | 2/2005 | Chen et al. | | 348/452 |

| FOREIGN PATENT DOCUMENTS | | |
|---|---|---|
| EP | 0 282 135 A1 | 9/1988 |
| JP | 2-217083 | 8/1990 |
| JP | 6-46390 | 2/1994 |
| WO | WO 02/093932 A3 | 11/2002 |

* cited by examiner

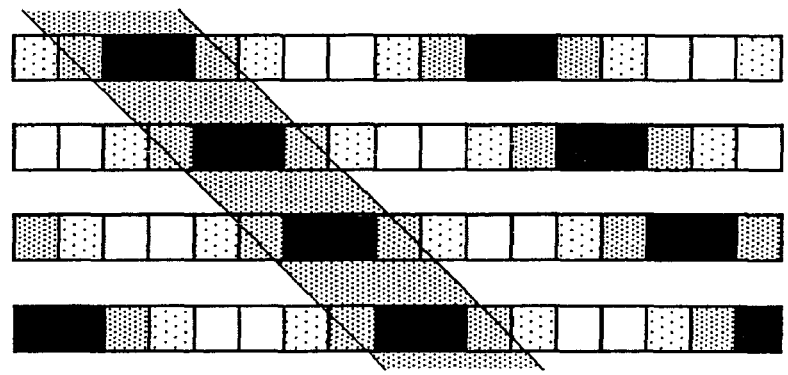
Fig. 8A
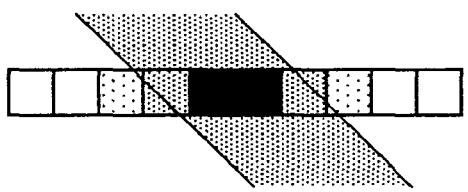
Fig. 8B
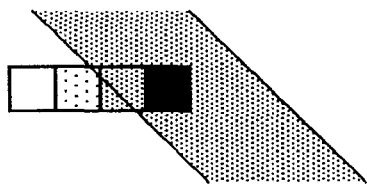 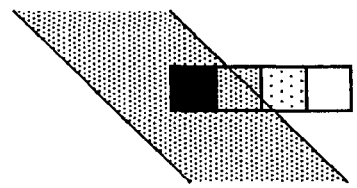
Fig. 8C  Fig. 8D

APPARATUS AND METHOD OF MOTION ADAPTIVE IMAGE PROCESSING

BACKGROUND OF THE INVENTION

1. Field of the Invention

This invention relates to motion adaptive image processing.

2. Description of the Prior Art

Video image capture represents a spatial and temporal sampling process. An image is captured as a set of pixels arranged in rows or lines. Successive images are captured at spaced instants in time.

A complication is the common use of interlaced video capture and processing. In an interlaced video signal, each image is handled as two sets or fields of alternate lines of pixels. For example, odd numbered lines might be included in one field, whereas even numbered lines could be included in the next field. An advantage of interlaced techniques is that they give an apparent doubling of the image rate, so reducing flicker effects, for no substantial increase in video signal bandwidth.

All of these aspects of sampling can give rise to alias effects if an attempt is made to capture or process video material having spatial or temporal frequencies which are too high for the respective sampling rate. But a particular alias problem will be described here in the area of interlace to progressive scan video conversion.

If it is desired to convert between interlaced video and progressive scan (non-interlaced) video, then for non-moving images it is merely necessary to interleave two successive fields to recreate a non-interlaced frame having all lines of pixels present. However, if there is any significant inter-field motion, this approach may not work. In such circumstances it can be more appropriate to derive the lines of pixels which are missing in one field from other pixels in that same field. In other words an intra-field interpolation process is used.

In practice, a video source may comprise image sequences in which some regions represent moving images whilst some regions do not. For example, when a newscaster speaks to a fixed camera, the newscaster's mouth, face, and head may move considerably, whilst their torso, the desk and the wall behind them do not.

Therefore the different conversion strategies noted above may be appropriate within different regions of the same image. It is therefore important to determine which strategy to use for a given pixel.

Interpolation will generally give a worse result than interleaving for non-moving portions, whereas interleaving and will generally give a worse result than interpolation for moving portions. So, the choice of the more appropriate technique is very important.

Notably, the presence of noise within the video signal can cause differences between successive fields that may be erroneously interpreted as motion, causing in turn different interpolation strategies to be used that give different output results in the progressive image, thereby exacerbating the noise. An example of such 'motion noise' causing a discontinuity in interpolation strategy can be seen in the interpolated image of some stairs shown in FIG. 12 of the accompanying drawings.

It would therefore be desirable to reduce the impact of the noise-induced misclassification of pixels as representing moving image regions.

It is an object of the invention to seek to mitigate and alleviate the above problem.

SUMMARY OF THE INVENTION

In one aspect of the present invention, an image processing apparatus for image conversion, comprises first motion detecting means operable to detect motion to a first level of sensitivity, second motion detecting means operable to detect motion to a second level of sensitivity, with the second level of sensitivity being of greater sensitivity than the first level of sensitivity so that the second motion detecting means can detect smaller amounts of motion than the first motion detecting means, conversion selection means operable to select respectively either a first conversion process or a second conversion process for a given point in an image dependant upon whether motion is detected at that point or not, in which the conversion selection means operates independently of the second motion detecting means if the degree of motion within an image or a part thereof detected by the first motion detecting means exceeds a threshold amount.

In another aspect of the present invention, a method of image processing for image conversion, comprising the steps of detecting motion in an image segment with a first level of sensitivity, detecting motion in the image segment with a second level of sensitivity if the degree of motion detected in the image segment using the first motion detector exceeds a threshold value, and selecting respectively either a first conversion process or a second conversion process for a given point in the image segment dependant upon whether motion is detected at that point or not.

Advantageously, the above aspects allow an image to be processed with a conditional usage of the more sensitive motion detection method. Consequently, detailed motion detection can therefore still be applied around the edges of a region of motion to more accurately determine its extent, whilst at the same time mitigating the effects of motion noise in generally static regions. This serves to improve overall picture quality for example in an interlace to progressive scan conversion.

Further respective aspects and features of the invention are defined in the appended claims. Features from the dependent claims may be combined with features if the independent claims as appropriate and more merely as explicitly set out in the claims.

BRIEF DESCRIPTION OF THE DRAWINGS

The above and other objects, features and advantages of the invention will be apparent from the following detailed description of illustrative embodiments which is to be read in connection with the accompanying drawings in which:

FIGS. 8a to 8d schematically illustrate alias detection techniques;

DESCRIPTION OF THE PREFERRED EMBODIMENTS

Figure 1:
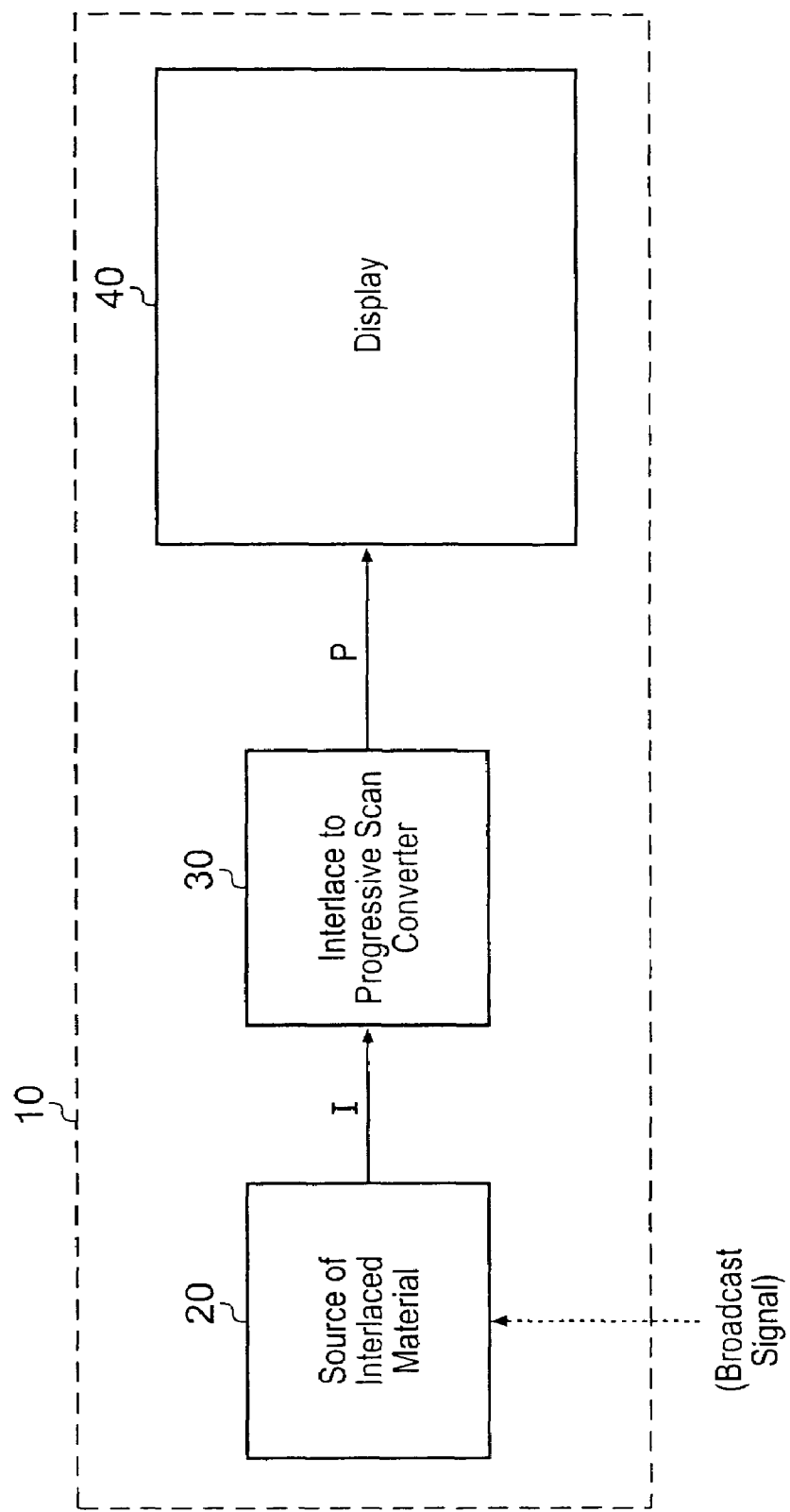
FIG. 1 schematically illustrates a flat-screen display arrangement.

FIG. 1 schematically illustrates a flat screen display arrangement 10 comprising a source of interlaced video material 20, an interlace to progressive scan converter 30 and a display panel 40 such as a liquid crystal (LCD) or plasma display. This illustrates a typical use of interlace to progressive scan conversion, in that many broadcast signals are in the interlaced format whereas many flat panel displays operate most successfully in a progressive scan format. Accordingly, in FIG. 1, a broadcast signal received by the source of interlaced material 20 is used to generate an interlaced signal for display. This is passed to the interlace to progressive scan converter 30 to generate a progressive scan signal from the interlaced signal. It is the progressive scan signal which is passed to the display 40.

It will be appreciated that the source of interlaced material 20 need not be a broadcast receiver, but could be a video replay apparatus such as a DVD player, a network connection such as an internet connection and so on.

Figure 2:
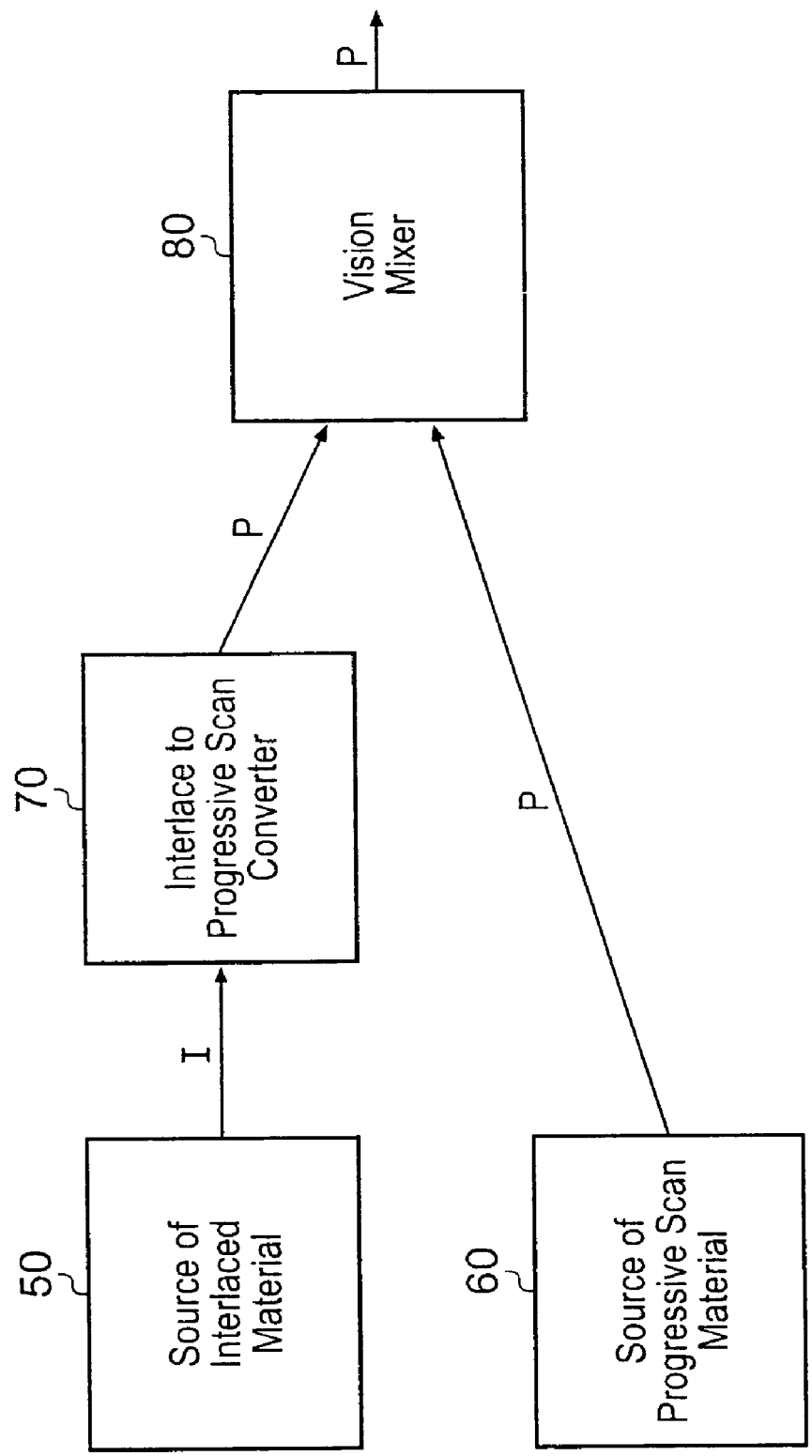
FIG. 2 schematically illustrates video mixing operation in a studio environment.

FIG. 2 schematically illustrates a video mixing operation in a studio environment, in order to give another example of the use of interlace to progressive scan conversion. Here, a source of interlaced material 50 and source of progressive scan material 60 are provided. These sources could be cameras, video replay apparatus such as video tape recorders or hard disk recorders, broadcast receivers or the like.

The interlaced output from the source of interlaced material 50 is supplied to an interlace to progress scan converter 70 to generate a progressive scan signal. This can be processed by the vision mixer 80 along with the progressive scan material from the source 60 to generate a processed progressive scan output. Of course, the progressive scan output of the vision mixer 80 can be converted back to an interlaced format if required, e.g. for subsequent broadcast or recording. It will also be appreciated that the vision mixer 80 is just one example of video processing apparatus; instead, a digital video effects unit, for example, could be used at this position in FIG. 2.

Figure 3:
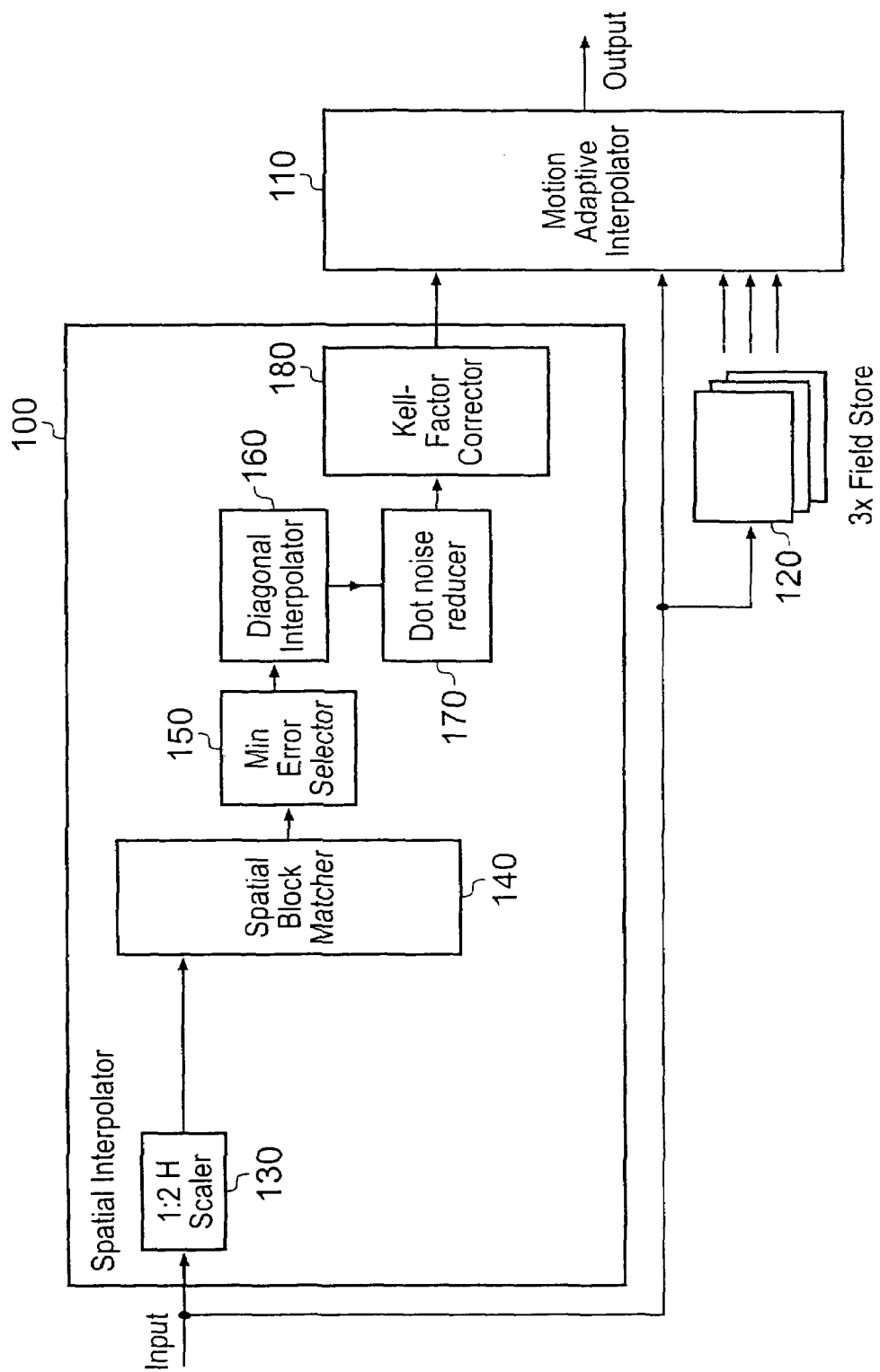
FIG. 3 schematically illustrates an interlace to progressive converter.

FIG. 3 schematically shows an interlace to progressive scan converter. In general terms, the converter comprises an intra-field interpolator such as a spatial interpolator 100, a motion adaptive interpolator 110 and a set of three field stores 120.

The converter of FIG. 3 operates to generate output progressive scan frames at the same repetition frequency as the input interlaced fields. Therefore, a main requirement of the converter is to generate the "missing" pixels in each interlaced field to turn that interlaced field into a progressive scan frame. This can be achieved in one of two ways. On one hand, the spatial interpolator 100 generates the "missing" pixels by spatial interpolation within the field concerned. In other words, this is an intra-field operation. On the other hand, the motion adaptive interpolator generates the missing pixels by inserting pixels from an adjacent field of the opposite polarity. This is valid only if there is no image motion between the fields, so the basic organisation of FIG. 3 is that the output of the spatial interpolator 100 is used at image positions where image motion is detected, while the output of the motion adaptive interpolator 110 is used at pixel positions where image motion is not detected. For simplicity of operation, the spatial interpolator operates at each pixel position, and the motion adaptive interpolator either selects the output of the spatial interpolator, or selects a pixel from another field of the opposite polarity for output, or mixes the two.

The motion adaptive interpolator will be described in more detail below. First, the spatial interpolator will be briefly described.

The spatial interpolator comprises a 1:2 horizontal pixel scaler 130, a spatial block matcher 140, a minimum error selector 150, a diagonal interpolator 160, a dot noise reducer 170 and a Kell-factor corrector 180. The operation of each of these is summarised below.

The scaler 130 uses horizontal linear interpolation to generate one additional pixel value between each two pixels of the input interlaced field (i.e. a 1:2 scaling operation). So, the horizontal resolution (at least in terms of number of available pixel values) is doubled, but no difference is made at this stage to the vertical resolution.

The overall operation of the spatial block matcher 140 and the diagonal interpolator 160 is to detect the orientation of an image feature relevant to a pixel position where a new pixel is to be interpolated, and then to apply an interpolation along that image feature direction. So, if a current pixel position to be interpolated lies within a diagonal image feature (a line, an edge etc.) at, say, 45° to the horizontal, interpolation of that new pixel would take place along that 45° direction. This can tend to give a better output result than restricting the interpolation to horizontal or vertical interpolation. A key part of this process, clearly, is therefore to detect the direction of an image feature at each pixel position.

Figures 4A, 4B, 4C:
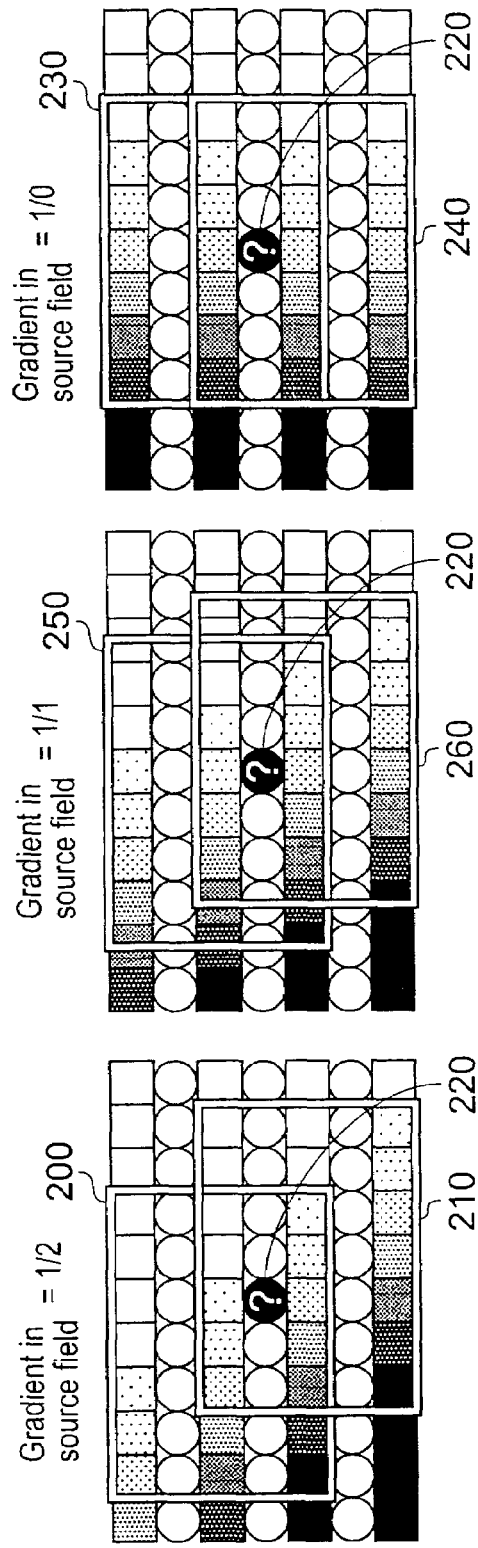
FIGS. 4a to 4c schematically illustrate gradient detection.

Referring now to FIGS. 4A-4C, this detection is carried out using a block matching process. FIG. 4A schematically illustrates a successful block match between two blocks 200, 210 of pixels around the position of an unknown pixel 220 (a circle with a question mark inside). Indeed, the notation used in the present drawings is that a square indicates a known pixel whereas a circle indicates a pixel to be interpolated by the diagonal interpolator 160. The shading in FIGS. 4A to 4C is a schematic representation of an image feature.

So, referring to FIG. 4A, a successful block match is obtained between the blocks 200, 210 around the unknown pixel position 220, indicating a gradient of an image feature of 1/2.

Turning now to FIG. 4C, an image feature is vertical and there is again a successful block match between overlapping blocks 230, 240.

However, in FIG. 4B, the image feature has a gradient of 1/1. It is not possible to obtain a successful block match with the blocks at integral pixel positions. A successful match between blocks 250, 260 occurs at a half integral pixel position. Accordingly, in order to detect gradients of this nature (indeed any gradients sharper than 1/2), it is necessary to operate at a sub-pixel accuracy. In the present case, a half-pixel accuracy was adopted, by using pixels from the 1:2 scaler. If a greater accuracy still was used, (e.g. quarter-pixel accuracy) then gradients yet closer to vertical could be detected.

FIGS. 5 and 6A to 6E schematically illustrate the spatial block matching operation.

As noted above, spatial block matching is carried out at sub-pixel accuracy; in this case half-pixel accuracy.

A range of block sizes is used, with corresponding search ranges (maximum displacements relative to the pixel position under test). Taking into account the 1:2 scaling operation, example block sizes and search ranges are given in the following table:

| Block Size (in scaled pixels) | Search Range (in scaled pixels) |
|---|---|
| 3v × 5h | 0h |
| 3v × 5h | ±1h |
| 3v × 7h | ±2h |
| ... | ... |
| 3v × 41h | ±19h |

Figure 5:
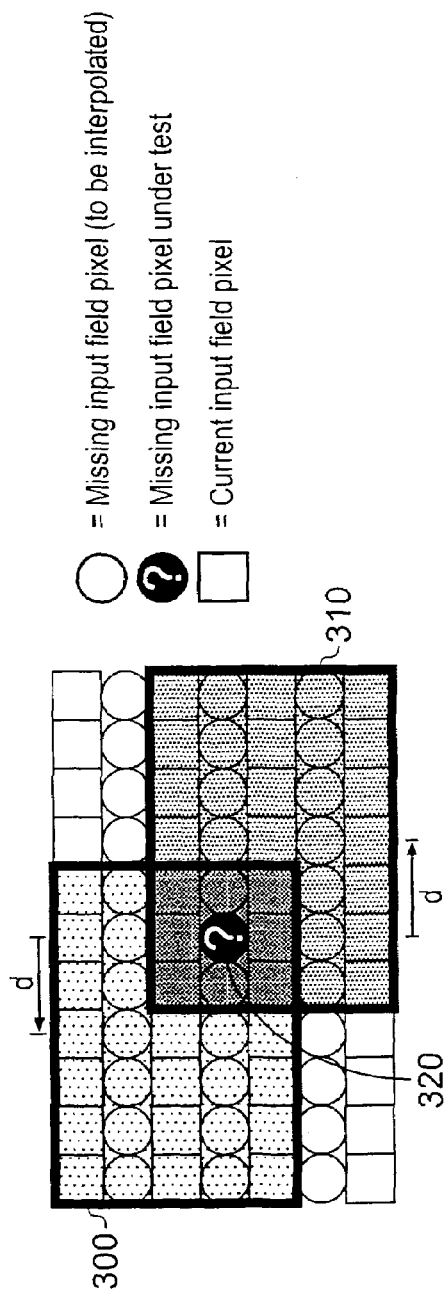
FIGS. 5 and 6a to 6e schematically illustrate a spatial block matching operation.
Figure 6C:
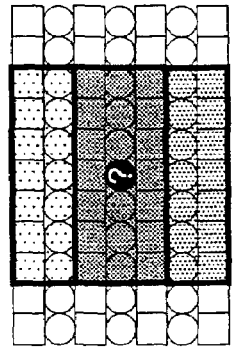
Figure 6B:
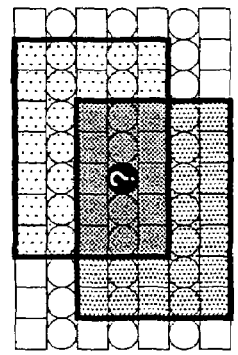
Figure 6A:
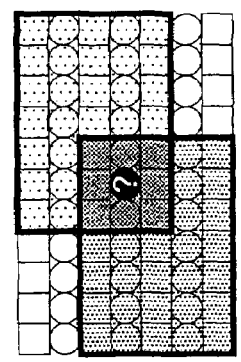
Figure 6E:
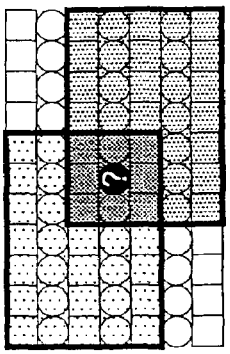
Figure 6D:
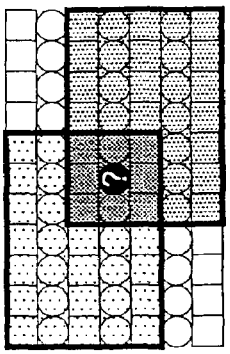

FIG. 5 schematically illustrates a block match operation between two blocks of 3v (vertical) by 7h (horizontal) pixels 300, 310, around an unknown pixel position 320. The variable d signifies a horizontal displacement of the block's horizontal centre from the pixel position under test. A condition applied to the block matches is that the blocks must always overlap the pixel position under test. Also, the blocks are shown displaced in integral numbers of real pixel displacements (so a displacement of m corresponds to a displacement of 2m interpolated pixels). Accordingly, the particular block size shown in FIG. 5 allows nine possible tests including at a displacement of −2 pixels (FIG. 6A) −1 pixel (FIG. 6B), 0 pixels (FIG. 6C), +1 pixel (FIG. 6D), and +2 pixels (FIG. 6E).

Note that the displacement is indicated as a displacement from the centre. The two blocks are displaced by equal amounts, though in opposite directions. Symmetrical displacements are used because otherwise the block matching could detect lines or edges which are not relevant to the pixel under test.

A sum of absolute differences (SAD) is calculated for each block match. This is defined as:

$$SAD(x, y, d, n) = \sum_{dx=-n}^{n} \sum_{dy=-3,-1,1} \sum_{RGB/YCbCr} |p(x-d+dx, y+dy) - p(x+d+dx, y+dy+2)|$$

where x, y represent the current pixel co-ordinate (y being a frame line number), d is the displacement being tested, and n is the "radius" of the block (the block width is n'=2n+1).

In general terms, the SAD values for three colour components (red, green and blue) are combined, and a minimum normalised SAD value determines a gradient for interpolation. Various checks are made to avoid poor interpolation, as described below.

Figure 7A:
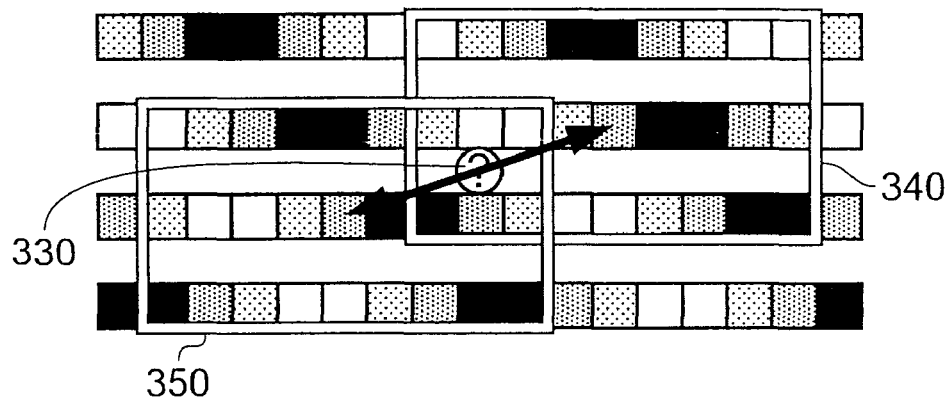
FIGS. 7a and 7b schematically illustrate an alias situation.
Figure 7B:
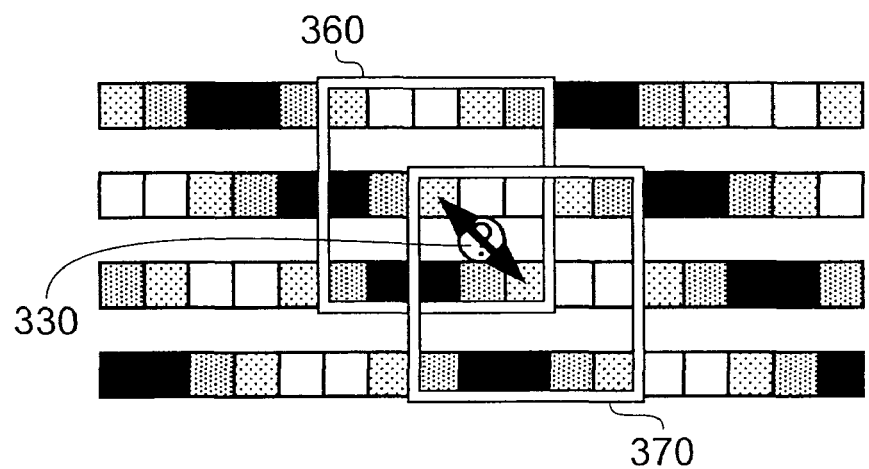

Measures are taken to avoid problems caused by alias situations. FIGS. 7A and 7B illustrate a possible alias situation.

Referring to FIG. 7A, a block match between blocks 340 and 350 suggests that an unknown pixel 330 should be a dark grey colour. Here, the block match is 100% successful and so the SAD value would be zero (note that this is a schematic example!)

However, in FIG. 7B, a block match between blocks 360 and 370 is also 100% successful, again giving a SAD value of zero. The block match of FIG. 7B suggests that the unknown pixel 330 should be a light grey colour.

This conflict of block match results is a product of aliasing between the closely spaced diagonal image features in the image portions shown in FIGS. 7A and 7B. While it may at first appear that either diagonal line is equally valid (i.e. a steep diagonal line from upper left to lower right or a more gentle diagonal line from upper right to lower left), a processing rule has been set up to allow an appropriate selection to be made.

The basis of the rule is that the block match process is restricted so that only areas considered to be "line segments" are detected. That is to say, each block in a block match should contain a line segment.

A digitised line segment is considered to have two properties. Firstly, it is monotonic along the central scan line row of the block in question, and secondly there is a vertical transition between scan lines in the block in question. The way in which these properties may be tested will be described with reference to FIGS. 8A to 8D.

In FIG. 8A, a source field contains multiple diagonal lines. FIG. 8B schematically illustrates one row of pixels within the image of FIG. 8A. FIGS. 8C and 8D illustrate the two edges of the diagonal line shown in FIG. 8B. It will be seen that each of these edges has a region of pixels which show a monotonic variation in luminance. Also, referring back to FIG. 8A, it can be seen that such segments exhibit a vertical transition between adjacent rows of pixels.

So, turning back to FIGS. 7A and 7B, the block match of FIG. 7A would be rejected in favour of the block match of FIG. 7B according to the rule described above. This is because the central line of pixels of the two blocks of FIG. 7B shows a monotonic variation in luminance, whereas the centre line of pixels of the blocks 340, 350 in FIG. 7A does not.

The tests are performed separately in respect of each of the colour components (e.g. R, G and B). All three tests must be passed separately. Alternatively, for example to save hardware, fewer than three tests could be performed. For example, only the luminance, or only one colour component, might be tested. Of course, a YCbCr or YPbPr representation could be tested instead.

The diagonal interpolator 160 is a simple pixel averager: given a direction it picks the pixel in that direction on the line below and the pixel in that direction on the line above and averages them.

The dot noise reducer 170 involves a process which is applied to the output of the diagonal interpolator 160. A test is applied to detect whether an interpolated pixel lies within the maximum and minimum values of four neighbouring vertical and horizontal pixels, i.e. the pixels immediately above, below, left and right of the interpolated pixel. Note that the pixels above and below the interpolated pixel will be real pixels, whereas those to the left and right will be interpolated themselves.

If the interpolated pixel does not lie within this range, then;

Let v be the original value of the pixel under consideration, and let v' be v, clipped to lie within the range of the four locally neighbouring pixels.

Let the new pixel value be kDNR v'+(1−kDNR)v, where kDNR is a programmable constant.

The operation of the Kell-factor corrector 180 will now be described.

In the present discussion, references to the Kell-factor are simply to help explain the operation of this part of an exemplary system. What the filter is actually exploiting is simply the knowledge that the source image did not use the full bandwidth available to it, whether that is because of scanning artefacts or because of a low pass filtering process.

The Kell-factor is a quantity which represents a property of progressive scan and interlaced images. In order to represent the information being scanned, it is generally considered that only 70% (the Kell-factor) of the possible vertical bandwidth is (or should be) represented. Hence when performing an interlace to progressive scan conversion, it is potentially hazardous to attempt to produce a full vertical bandwidth image. Instead, a compensation to account for a Kell-factor of less than unity may be used.

One method to compensate for the Kell-factor would be to use a 70% bandwidth filter on the frame output of any interlace to progressive scan algorithm. However, one of the fields in the frame is 'real' data—i.e. it was sampled correctly, so the content arising from that field must by definition be perfect. Thus a method to filter just the interpolated lines is used.

Figure 9A:
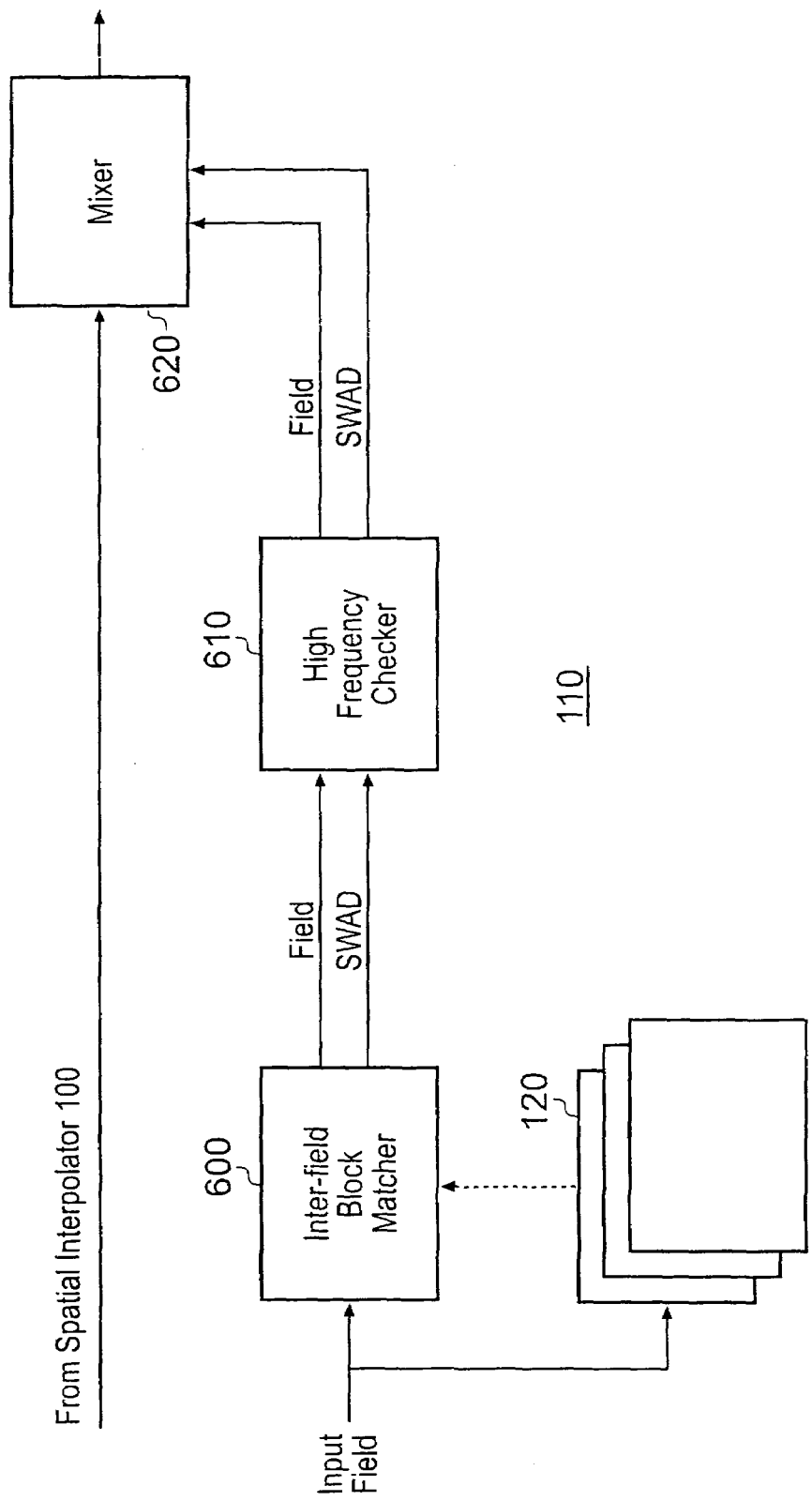
FIG. 9a schematically illustrates a motion adaptive interpolator.

FIG. 9a schematically illustrates the operation of the motion adaptive interpolator 110. The interpolator 110 comprises an inter-field block matcher 600, a high frequency checker 610 and a mixer 620.

Figure 9B:
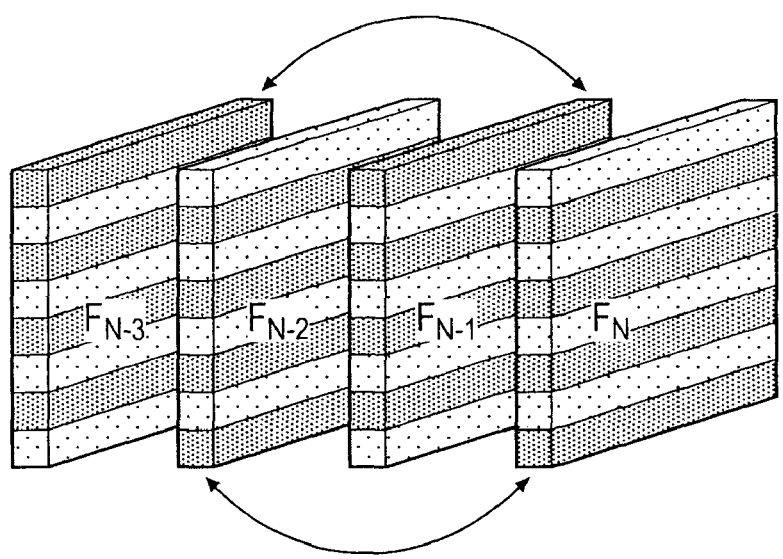
FIG. 9b schematically illustrates motion detection between successive video fields.

The inter-field block matcher 600 uses data from the current input field and the three field stores 120 to carry out inter-field motion comparisons. This involves comparing blocks of pixels in the current field ($F_N$ in FIG. 9b) with correspondingly positioned blocks in the previous field of the same type ($F_{N-2}$) and likewise comparing the preceding field ($F_{N-1}$) and the previous field of the same type ($F_{N-3}$). The results of these comparisons are used to detect a degree of motion in the image.

In particular, weighted sums of absolute differences (SWADs) are generated as follows.

Four block matches are performed to produce two SWADs, $SWAD_{AREA}$ and $SWAD_{LOCAL}$. These are:
  a 5h×4v weighted block match on fields $F_N$ and $F_{N-2}$.
  a 5h×3v weighted block match on fields $F_{N-1}$ and $F_{N-3}$.
  a 1h×1v weighted block match on fields $F_{N-1}$ and $F_{N-3}$.
  a 1h×2v weighted block match on fields $F_N$ and $F_{N-2}$.

Weighted block matches sum weighted absolute differences between coincident pixels, SWAD.

$$SWAD = \sum_{dx=-2}^{2} \sum_{dy=-2,0,2} \sum_{RGB/YCbCr} w(dx, dy)|F_{N-1}(dx, dy) - F_{N-3}(dx, dy)|$$

where $F_{N-1}(dx,dy)$ is the value at the frame-relative position dx, dy to the current pixel. Typical values for the weights are:

| | |
|---|---|
| 5h × 4v block: | [12/1024 23/1024 28/1024 23/1024 12/1024 |
| | 32/1024 62/1024 77/1024 62/1024 32/1024 |
| | 32/1024 62/1024 77/1024 62/1024 32/1024 |
| | 12/1024 23/1024 28/1024 23/1024 12/1024] |
| 5h × 3v block: | [20/1024 39/1024 48/1024 39/1024 20/1024 |
| | 48/1024 94/1024 117/1024 94/1024 48/1024 |
| | 20/1024 39/1024 48/1024 39/1024 20/1024] |
| 1h × 2v block: | [128/256 |
| | 128/256] |
| 1h × 1v block: | [255/256] - effectively no weighting. |

Summing the first two SWADs gives an area-based block match, $SWAD_{AREA}$.

Summing the latter two SWADs gives a localised block match, $SWAD_{LOCAL}$.

All three colour components contribute to the SWADs in the same manner. The system need only maintain a SAD of the three components for each pixel, which is then weighted and combined with the values from the other pixels in the block. This means that this aspect of the process requires only 5 line stores of about 10 bpp (bits per pixel).

Optionally, the high frequency checker 610 is arranged to detect high frequencies in the input fields. The algorithm is based on the following principle. If interleaving the two source fields produces a lot of high frequency energy, then it is appropriate to try to make sure that the inputs are reasonably static. Only static video can produce reliable high frequencies; highly aliased motion can produce high frequencies, but this is not a desirable situation for inter-field interpolation. If motion is present, then high frequencies may be produced where the fields are incorrectly interleaved.

Figure 10:
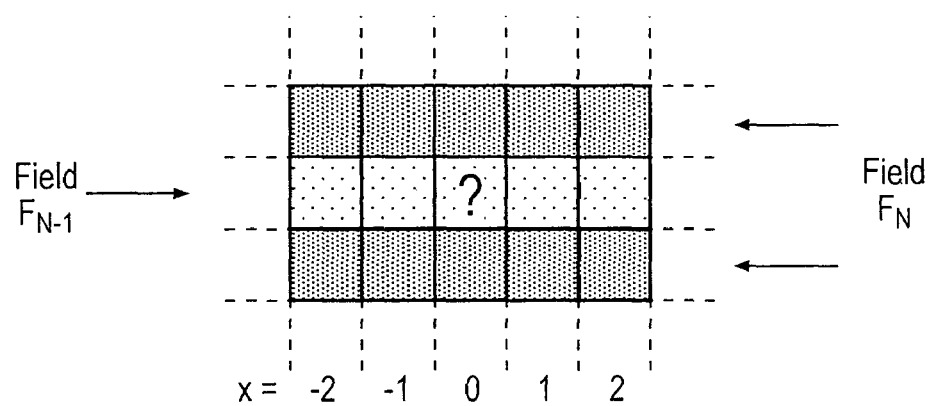
FIG. 10 schematically illustrates a high frequency check operation.

Referring to FIG. 10, the high frequency checker uses the lines above and below the currently interpolated pixel from the current field $F_N$ and the line from the preceding field $F_{N-1}$ that corresponds to the missing line. The HFC may be considered as a 5×3 pixel neighborhood check.

Let $HFC_{thresh1}$ and $HFC_{thresh2}$ be two programmable constants, with the former greater than the latter.

Set a flag: exceededHighEnergy=false

Over each component (or a subset of them) (RGB/YPbPr)—where YPbPr indicates the colour space in a high definition system, in a similar way to YCbCr in a standard definition system:

Set energy=0

For the pixels having a horizontal position x=−2,−1,0,1,2 (relative to the current pixel), let the interleaved ($F_{N-1}$) field value be $v_0$, and the current field value of the line above and below be $v_{-1}$ and $v_1$, then:

if $v_0<\min(v_1,v_{-1})$, set diff=min($v_1,v_{-1}$)−v0
  else if v0>max(v1,v−1), set diff=v0−max(v1,v−1)
  else set diff=0
  If (diff>$HFC_{thresh1}$), set energy=energy+($HFC_{thresh1}$−$HFC_{thresh2}$)*weighting[x]
  else if (diff>$HFC_{thresh2}$), set energy=energy+(diff−$HFC_{thresh2}$)*weighting[x]
  If energy >$HFC_{allowance}$, set flag exceededHighEnergy=true This ends the processing carried out over each component.

Subsequently, if exceededHighEnergy=true, increase $SWAD_{AREA}$ by a programmable constant value, $HFC_{penalty}$.

The increase in $SWAD_{AREA}$ will tend to act against the use of the motion adaptive pixel at that output position.

The mixer 620 operates according to the criteria $SWAD_{AREA}$ and $SWAD_{LOCAL}$ and also various thresholds $thresh_{1,2, etc}$.

If $SWAD_{LOCAL}$>$thresh_1$, use only spatially interpolated field, $F_{N'}$
Else if $SWAD_{AREA}$>$thresh_2$, use only spatially interpolated field, $F_{N'}$, only
Else if $SWAD_{AREA}$<$thresh_3$, use only field $F_{N-1}$
Else mix field $F_{N-1}$ and $F_{N'}$:

let α=($thresh_2$−$SWAD_{AREA}$)/($thresh_2$−$thresh_3$)

The resulting pixel value=α$F_{N-1}$+(1−α) $F_{N'}$. In other words, α represents pixel motion and determines contributions from the intra and inter-field interpolators.

Whilst only $F_{N-1}$ and $F_{N'}$ are mixed in the above equation, it will be appreciated that additional image fields or portions thereof may be mixed with $F_{N-1}$ and $F_{N'}$ at a given pixel position, for example the unfiltered lines of $F_N$ for alternate lines of the image, or earlier image field $F_{N-3}$ if there is substantially no motion at all.

The presence of noise in successive fields of the video input, however, can result in apparent motion being detected where in fact there is none. Such noise can affect the SWAD difference calculations and can also resemble high-frequency artefacts, affecting the high frequency checking.

A Gaussian filter that horizontally filters the input field data used for motion detection (but not for the final generation of output frames) helps to reduce noise and hence reduce spurious motion detection. The longer the filter, the more noise is removed and so the less motion is detected. However, if the filter becomes too large, then the detection of valid motion can be compromised. In practice, a 7-tap filter (7h×3v) provides a good compromise.

Figure 11B:
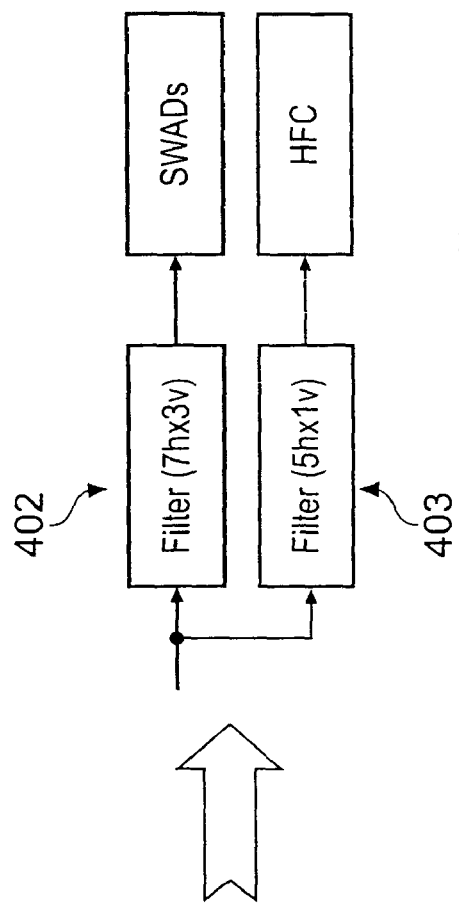
FIGS. 11a & 11b schematically illustrate arrangements of filters.
Figure 11A:
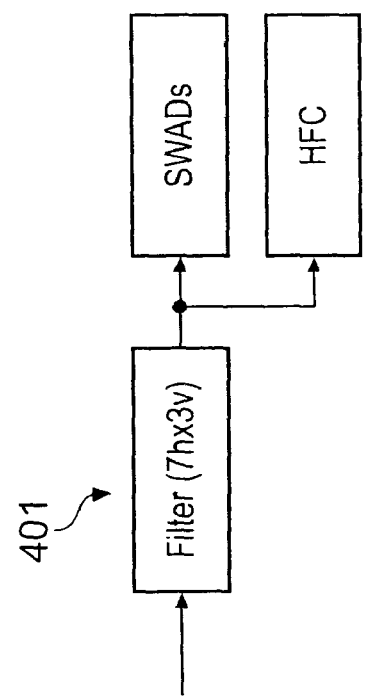

However, the HFC and SWAD calculations differ in their sensitivity to noise. Referring to FIGS. 11a and 11b, the common input Gaussian filter 401 as described above and shown in FIG. 11a is replaced by the new arrangement of FIG. 11b, in which two different filters 402, 403 are used, one for each of the inputs to the HFC and the SWAD calculations respectively. The SWAD calculation filter remains a similar 7-tap filter (7h×3v) 402, whilst the HFC calculation filter is reduced to a 5-tap filter (5h×1v) 403. Consequently the HFC calculation filter overall increases its sensitivity to high spatial-frequency features (i.e. to features of a smaller size as compared to the SWAD sensitivity). In particular, removing vertical filtering (by moving from 3v to 1v), which impacts on the detection of vertical motion in fine horizontal lines such as hair in an image, improves the sensitivity.

Significantly, however, the $SWAD_{AREA}$ and $SWAD_{LOCAL}$ calculations themselves are based on different block sizes. (This enables $SWAD_{LOCAL}$ to be used to finely adjust the edges of regions where motion is detected). Consequently, these calculations therefore also have different sensitivities to noise. In particular, $SWAD_{LOCAL}$ shows a greater sensitivity to noise in the input data than $SWAD_{AREA}$, potentially resulting in spurious motion detection. In principle, splitting the filter operation yet further so that inputs for $SWAD_{LOCAL}$ calculations are subject to a longer filter than that used with $SWAD_{AREA}$ may be applicable. However, this is a less desirable solution as storing two copies of the previous fields N−1, N−2 and N−3, each filtered in two different ways, would be costly in terms of memory and processing. In addition, smoothing the input data too much with a long filter could affect the ability of $SWAD_{LOCAL}$ to provide fine adjustment to motion region edges.

Figure 12:
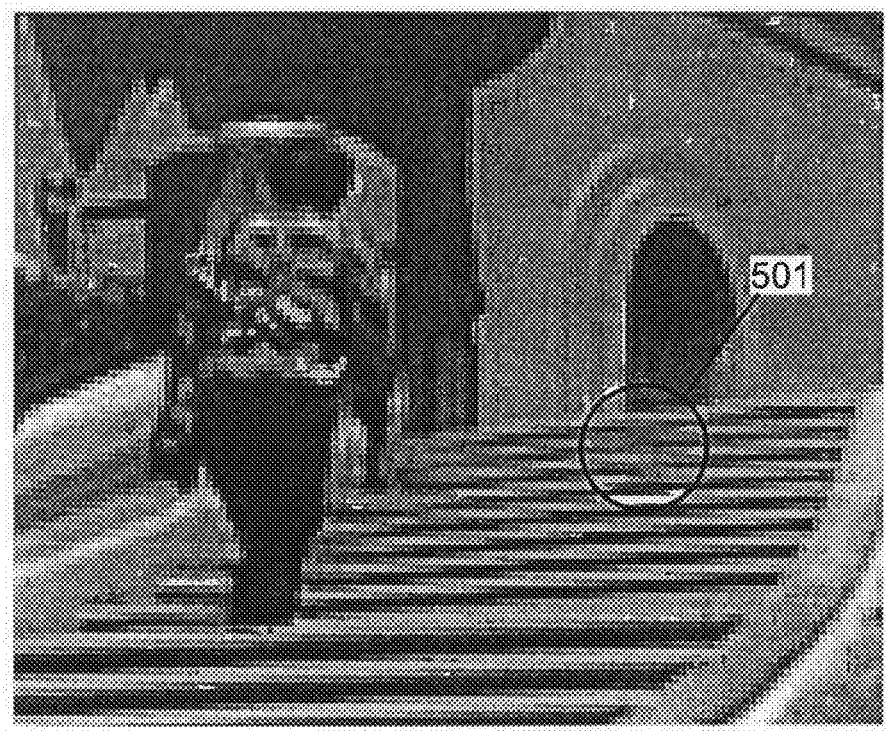
FIG. 12 illustrates the effect of motion noise.

As noted above, when the $SWAD_{LOCAL}$ value is greater than a threshold $thresh_1$, motion is detected in the local area. If motion is detected in the local area, then only spatial interpolation is used. However, as $SWAD_{LOCAL}$ is comparatively sensitive to noise, it can declare noise artefacts to signify motion, resulting in the use of localised regions of spatial interpolation centred on these noise artefacts. Thus 'motion noise' can result in inconsistent use of interpolation strategies within an otherwise uniform image region, resulting in turn in interpolation discontinuities, and the use of spatial interpolation where it is not needed. The result of sensitivity to motion noise may be seen in the example of FIG. 12A. In this figure, the steps are successfully interpolated by interleaving pixels from successive fields, except in the identified region 501, where the detection of apparent motion due to noise by $SWAD_{LOCAL}$ triggered the unnecessary use of spatial interpolation around the noise source.

Consequently, in the identified region, an intra-field interpolation (in this case, spatial interpolation) has resulted in blurring between the steps as pixels above and below the noisy region are not of the correct colour for the middle part of the step. The result of using intra-field interpolation is clearly not as good as the inter-field interpolation in areas determined as being static.

To address this problem, in an embodiment of the present invention the use of $SWAD_{LOCAL}$ is made conditional. Specifically, $SWAD_{LOCAL}$ is only used if $SWAD_{AREA}$ detects sufficient motion in the same segment of the image field. This exploits the observation that in real video images, it is unlikely for one or two pixels to show motion in the absence of motion within the surrounding segment.

Use of $SWAD_{LOCAL}$ is therefore made dependent on whether a ratio of pixels detected in motion to pixels not detected in motion—but for which motion detection is deemed reliable—exceeds a threshold. The determination of this ratio is detailed below.

In an embodiment of the present invention, pixels are placed in one of three categories:

Complex—motion information should be used from neighbouring pixels as the motion information from these pixels is considered to be unreliable.

Mid-Complex—motion information from these pixels is considered to be reliable.

Plain—motion information from these pixels is considered to be indeterminate.

If a region is 'plain', then it is not possible to conclude whether motion is present. If a region is 'complex', then in principle it should be static (even if possibly due to aliased motion), and should not be a considered a reliable source of motion information. The use of $SWAD_{LOCAL}$ is therefore determined on the basis of the ratio of moving to static mid-complex pixels.

A mid-complex pixel is defined as being any pixel that is not complex or plain.

For a pixel position x, y, and colour channel c (of for example red, green and blue), then a pixel is complex if, for any channel c, $$|F_N(x,y,c)-F_{N-2}(x,y,c)|+sd<|F_{Sx}(x,y,c)-F_{N-1}(x,y,c)|$$

and $|F_{N-1}(x,y,c)-F_{N-3}(x,y,c)|+sd<|F_{Sx}(x,y,c)-F_{N-1}(x,y,c)|$

Where sd is the standard deviation of the pixels in the current segment, calculated in field N−1, $F_N(x,y,c)$ is the current input field, $F_{N-1}(x,y,c)$, $F_{N-2}(x,y,c)$ and $F_{N-3}(x,y,c)$ are previous input fields, and $F_{Sx}(x,y,c)$ is the spatially interpolated version of the current input field. Optionally, the standard deviation can be clipped to a predetermined maximum value. It will be appreciated that an alternative to a standard deviation, such as a sum of absolute differences, could be used with appropriate scaling.

In each case in the above pair of inequalities, the left hand side is a measure of how static the values appear to be, while the right hand side is a measure of how different the spatial and interleaved images are.

In the case where there is insufficient storage to fully hold the N−3 field, a version based on the sum of the three colour channels $\Sigma_{c=red,green,blue}|F_{N-1}(x,y,c)-F_{N-3}(x,y,c)|$ may be used instead by the second inequality.

Likewise, for a pixel x, y, and colour channel c (of for example red, green and blue), then a pixel is plain if, for all channels c, $$|F_{Sx}(x,y,c)-F_{N-1}(x,y,c)|<sd$$

and $|F_N(x,y,c)-F_{N-1}(x,y,c)|<sd$

Where the terms are as defined above.

A mid-complex pixel is therefore any pixel that is not determined to be complex or plain according to the above inequality tests.

It will be appreciated that references to 'any' or 'all' colour channels encompasses systems with a single colour channel, such as a luminance channel.

It will likewise be appreciated that by reversing the above four inequalities, i.e. by changing '<' to '>=' and changing 'and' to 'or', the inequalities together become a positive test for mid-complexity pixels. When a mid-complex pixel is determined, a segment statistic 'count mid-complex' (CMC) is incremented. If the $SWAD_{AREA}$ value is also greater than a threshold value, a segment statistic 'count motion mid-complex' (CMMC) is also incremented.

Figure 13:
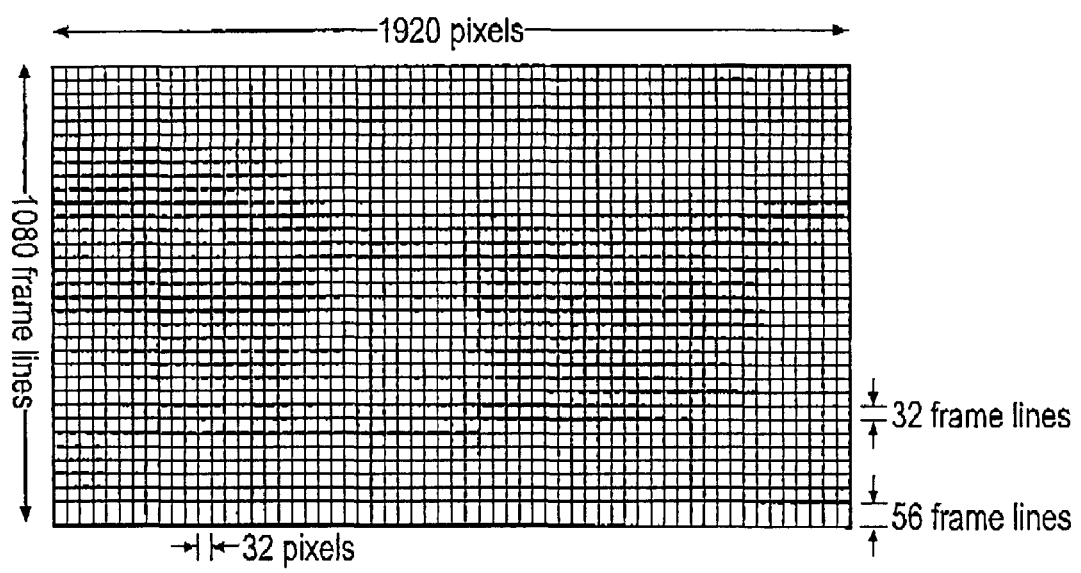
FIG. 13 schematically illustrates segments of an image field.

Referring now to FIG. 13, the segments over which these statistics are generated are created by splitting a field into segments of size 32 pixels×16 field lines. At the field edges, segments are made bigger to accommodate the remaining edge pixels, rather than having smaller edge segments that may be statistically unsound. In the case of a 1920×1080 high definition image field as shown in FIG. 13, there is an exact horizontal fit but not an exact vertical fit, thus requiring vertically larger segments at the bottom of the image as shown.

$SWAD_{LOCAL}$ is then only used if the ratio of CMMC:CMC exceeds a threshold value. Typically, this is expressed as CMMC>CMC*$Constant_1$, where $Constant_1$ determines the desired threshold value. Optionally, an additional requirement that CMMC>$Constant_2$ (i.e. that a minimum number of mid-complex pixels indicate motion) can be imposed. Moreover, the threshold value can be set in accordance with the variance of the segment. For example, one of four predetermined threshold values can be selected according to the variance level.

By implementing the above conditional use of $SWAD_{LOCAL}$, fine motion detection can therefore still be applied around the edges of a region of motion, whilst mitigating the effects of motion noise in generally static regions. This serves to improve overall picture quality in the interlace to progressive scan conversion.

Thus, in summary, in embodiments of the present invention, $SWAD_{AREA}$ and $SWAD_{LOCAL}$ provide respective motion tests over different regions of the current and previous fields. The decision to switch between static and motion-based interpolation to progressive scan conversion methods depends upon whether these tests find motion. However, because $SWAD_{LOCAL}$ is more sensitive to noise, embodiments of the present invention limit its use to when a threshold degree of motion is determined by the application of $SWAD_{AREA}$. In embodiments of the present invention this threshold degree of motion is based upon those pixels within a test segment that are identified as being a reliable basis for a static or motion decision.

Figure 14:
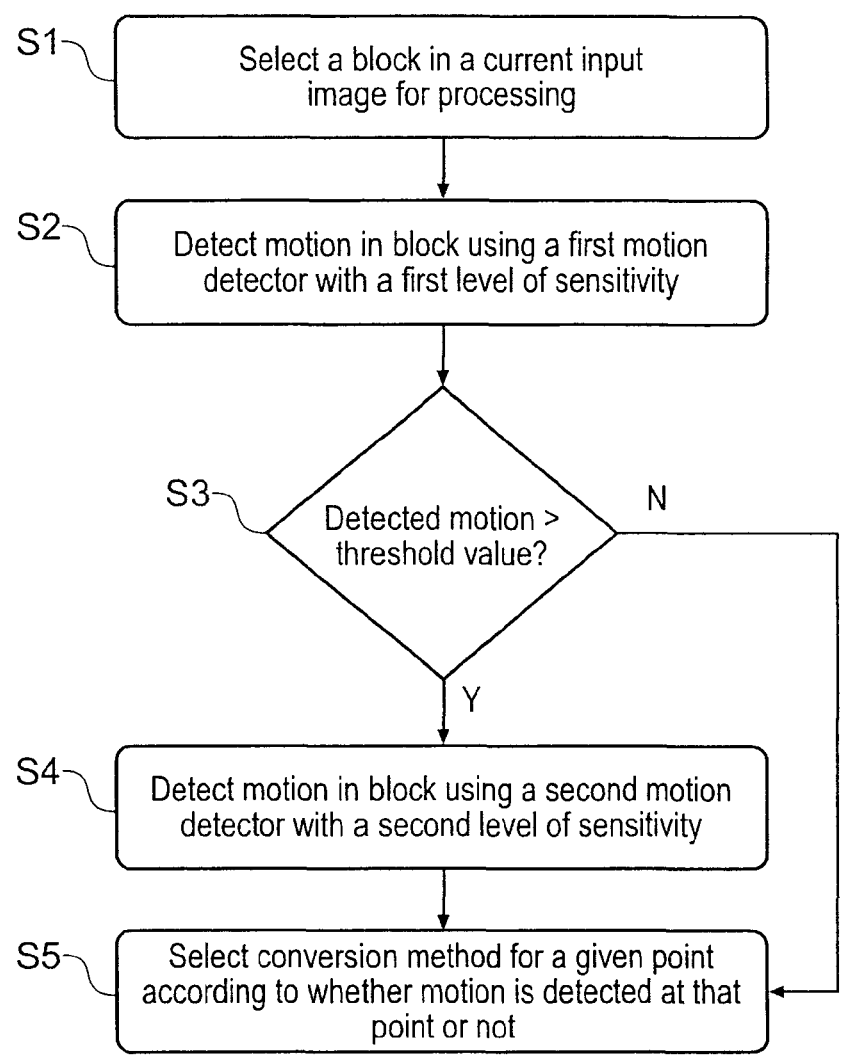
FIG. 14 is a flow diagram illustrating a method of image processing.

A corresponding method of image processing for converting interlaced images to progressive scan images, is now described with reference to FIG. 14, and comprises the steps of selecting (S1) a segment in a current input image for processing; detecting (S2) motion in the segment using a first motion detector with a first level of sensitivity; detecting (S4) motion within the segment using a second motion detector with a second level of sensitivity if (S3) the degree of motion detected in the segment using the first motion detector exceeds a threshold value; and selecting (S5) respectively either spatial interpolation or image field interleaving for a given point in the segment dependant upon whether motion is detected at that point or not.

It will be appreciated by a person skilled in the art that variations in the above method corresponding to the various operations of the apparatus disclosed herein are considered to be within the scope of the present invention, including:
that the first motion detector performs a weighted sum of absolute differences between images over an area which is larger than the corresponding area over which the second motion detector performs a weighted sum of absolute differences between images,
that the threshold degree of motion determined by use of the first motion detector is based only on those pixels of an image segment categorised as providing a reliable basis for motion determination, and
that the 'reliable' pixels are categorised as 'mid-complexity' pixels as disclosed herein.

It will be appreciated by a person skilled in the art that the reference to the mixing of fields $F_{N'}$ and $F_{N-1}$ is one of several potential mixing options available for interlacing images in an image sequence. Generalising $F_{N'}$ to $F_{Sx}$ and $F_{N-1}$ to $F_M$, a selection of interpolation modes may be defined as:
Mode 1: Zero field system delay (as in the description)—
$F_{Sx}$=interpolated field associated with field $F_N$
$F_M$=field $F_{N-1}$
Mode 2: One field system delay, backward mixing—
$F_{Sx}$=interpolated field associated with field $F_{N-1}$
$F_M$=field $F_{N-2}$
Mode 3: One field system delay, forward mixing—
$F_{Sx}$=interpolated field associated with field $F_{N-1}$
$F_M$=field $F_N$.

Consequently, the equation determining a complex pixel would correspond to $|F_N(x,y,c)-F_{N-2}(x,y,c)|+sd<|F_{Sx}(x,y,c)-F_M(x,y,c)|$ and $|F_{N-1}(x,y,c)-F_{N-3}(x,y,c)|+sd<|F_{Sx}(x,y,c)-F_M(x,y,c)|$;

the equation determining a plain pixel would correspond to $|F_{Sx}(x,y,c)-F_M(x,y,c)|<sd$ and $|F_N(x,y,c)-F_{N-1}(x,y,c)|<sd$, and the mixed pixel value would correspond to $\alpha F_M+(1-\alpha) F_{Sx}$.

It will be appreciated that the invention can be implemented in programmable or semi-programmable hardware operating under the control of appropriate software. This could be a general purpose computer or arrangements such as an ASIC (application specific integrated circuit) or an FPGA (field programmable gate array). The software could be supplied on a data carrier or storage medium such as a disk or solid state memory, or via a transmission medium such as a network or internet connection, or via combinations of these.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

APPENDIX

Some example Parameters:

|  | YPbPr setting | RGB setting |
|---|---|---|
| HFC weighting | [2 4 5 4 2] | [2 4 5 4 2] |
| $HFC_{thresh1}$ | 40 | 40 |
| $HFC_{thresh2}$ | 8 | 8 |
| $HFC_{allowance}$ | 218 | 128 |
| $HFC_{penalty}$ | 10 | 25 |
| thresh1 | 60 | 120 |
| thresh2 | 20 | 50 |
| thresh3 | 25 | 60 |
| $Constant_1$ | 32/256 | 32/256 |
| $Constant_2$ | 32 | 32 |

What is claimed is:

1. An image processing apparatus for image conversion, comprising:
a first motion detector configured to detect motion to a first level of spatial frequency sensitivity;
a second motion detector configured to detect motion to a second level of spatial frequency sensitivity, the second level of spatial frequency sensitivity being of greater sensitivity than the first level of spatial frequency sensitivity so that the second motion detector can detect smaller amounts of motion than the first motion detector; and
a conversion selector configured to select contributions from at least one of a first conversion process and a second conversion process for a given point in an image dependant upon whether motion is detected by the first motion detector at the given point or not, wherein
the conversion selector is configured to operate independently of the second motion detector if a degree of motion within the image or a part thereof including the given point detected by the first motion detector does not exceed a threshold amount.

2. The image processing apparatus according to claim 1, wherein the first and second motion detectors are configured to detect a level of spatial frequency sensitivity that is related to a size of an image feature so that a greater level of sensitivity corresponds with sensitivity to comparatively higher spatial frequency features.

3. The image processing apparatus according to claim 1, wherein the first and second motion detectors are included in a single motion detector configured to operate at the first level of spatial frequency sensitivity and at the second level of spatial frequency sensitivity respectively.

4. The image processing apparatus according to claim 1, further comprising:
an intra-field interpolator configured to perform spatial interpolation within some or all of a single image; and
an interleaver configured to interleave some or all of a plurality of images, wherein
the image conversion apparatus is configured to convert images from interlaced images to progressive scan images, and the first conversion process is an intra-field interpolation by the intra-field interpolator and the second conversion process is an image interleaving by the interleaver.

5. The image processing apparatus according to claim 1, wherein the first and second motion detectors are each configured to perform a weighted sum of absolute differences between images to detect image motion in respect of an image position.

6. The image processing apparatus according to claim 5, wherein an area of comparison within which the first motion detector performs a weighted sum of absolute differences between images is larger than a corresponding area of comparison within which the second motion detector performs a weighted sum of absolute differences between images, in order to detect motion in respect of an image position.

7. The image processing apparatus according to claim 1, wherein the first motion detector is configured to detect a degree of motion based only on those pixels of an image segment categorized, by a categorizing unit, as providing a reliable basis for motion determination.

8. The image processing apparatus according to claim 7, wherein the categorizing unit is configured to categorize a pixel as providing a reliable basis for motion determination if, for any color channel, a difference between interlaced image pairs of a same image field polarity corresponding to a current image or a next preceding image plus a standard deviation of pixels in an image segment are together greater than or equal to a difference between an intra-field interpolated version of the current image and the directly preceding image at that pixel position, and if, for all color channels, a difference between either a spatially interpolated version of the current image and a directly preceding image, or the current image and directly preceding image, is greater than a standard deviation of pixels in an image segment at that pixel position.

9. The image processing apparatus according to claim 7, wherein the categorizing unit is configured to categorize pixels as providing a reliable basis for motion determination if, for a pixel position x, y and any colour channel c, $|F_{Sx}(x,y,c) - F_M(x,y,c)| >= sd$ or $|F_N(x,y,c) - F_{N-1}(x,y,c)| >= sd$ and for a pixel position x, y, and all colour channels c, $|F_N(x,y,c) - F_{N-2}(x,y,c)| + sd >= |F_{Sx}(x,y,c) - F_M(x,y,c)|$ or $|F_{N-1}(x,y,c) - F_{N-3}(x,y,c)| + sd >= |F_{Sx}(x,y,c) - F_M(x,y,c)|$ where sd is the standard deviation of the pixels in an image segment, calculated in previous image field $F_{N-1}$, $F_N(x,y,c)$ is a current input image field, $F_{N-1}(x,y,c)$, $F_{N-2}(x,y,c)$ and $F_{N-3}(x,y,c)$ are prior input fields, $F_{Sx}(x,y,c)$ is a spatially interpolated version of input image field $F_N$ or $F_{N-1}$ and $F_M(x,y,c)$ is an available input image field temporally adjacent to $F_{Sx}(x,y,c)$.

10. A method of image processing for image conversion, comprising:
detecting motion in an image segment with a first level of spatial frequency sensitivity;
detecting motion in the image segment with a second level of spatial frequency sensitivity, the second level of spatial frequency being of greater sensitivity than the first level of spatial frequency sensitivity so that smaller amounts of motion can be detected than at the first level of spatial sensitivity, when a degree of motion detected in the image segment in the step of detecting motion in an image segment with a first level of spatial frequency exceeds a threshold value; and
selecting contributions from at least one of a first conversion process and a second conversion process for a given point in the image segment dependent upon whether motion is detected in the step of detecting motion in an image segment with a first level of spatial frequency at the given point or not.

11. The method according to claim 10, wherein, in the steps of detecting motion, a level of spatial frequency sensitivity is related to a size of an image feature so that a greater level of sensitivity corresponds with sensitivity to comparatively higher spatial frequency features.

12. The method according to claim 10, wherein the method of image processing is for image conversion from interlaced images to progressive scan images, the first conversion process is intra-field interpolation, and the second conversion process is image interleaving.

13. The method according to claim 10, wherein the step of detecting motion in an image segment with a first level of spatial frequency sensitivity and the step of detecting motion in the image segment with a second level of spatial frequency sensitivity each respectively comprises:
performing a weighted sum of absolute differences between images to detect image motion in respect of an image position.

14. The method according to claim 13, wherein the step of performing a weighted sum of absolute differences between images to detect motion in an image segment in the step of detecting motion in an image segment with a first level of spatial frequency sensitivity is based upon an area of comparison that is larger than a corresponding area of comparison used for the step of performing a weighted sum of absolute differences between images to detect motion in an image segment in the step of detecting motion in an image segment with a second level of spatial frequency sensitivity.

15. The method according to claim 10, wherein, in the steps of detecting motion, a degree of motion detected is based only on those pixels of an image segment categorized as providing a reliable basis for motion determination.

16. The method according to claim 15, further comprising: categorizing a pixel in an image segment as providing a reliable basis for motion determination if, for all colour channels, a difference between interlaced image pairs of a same image field polarity corresponding to a current image or a next preceding image and a standard deviation of pixels in an image segment are together greater than or equal to a difference between a spatially interpolated version of the current image and a directly preceding image at that pixel position, and if, for any colour channel, a difference between either an intra-field interpolated version of the current image and the directly preceding image, or the current image and directly preceding image, is greater than a standard deviation of pixels in an image segment at that pixel position.

17. The method according to claim 15, comprising: categorizing a pixel in an image block as providing a reliable basis for motion determination if, for a pixel position x, y and any colour channel c, $|F_{Sx}(x,y,c) - F_M(x,y,c)| >= sd$ or $|F_N(x,y,c) - F_{N-1}(x,y,c)| >= sd$ and for a pixel position x, y, and all colour channels c, $|F_N(x,y,c) - F_{N-2}(x,y,c)| + sd >= |F_{Sx}(x,y,c) - F_M(x,y,c)|$ or $|F_{N-1}(x,y,c) - F_{N-3}(x,y,c)| + sd >= |F_{Sx}(x,y,c) - F_M(x,y,c)|$ where sd is a standard deviation of the pixels in a test region, calculated in a previous image field $F_{N-1}$, $F_N(x,y,c)$ is a current input image field, $F_{N-1}(x,y,c)$, $F_{N-2}(x,y,c)$ and $F_{N-3}(x,y,c)$ are prior input fields, $F_{Sx}(x,y,c)$ is a spatially interpolated version of an input image field $F_N$ or $F_{N-1}$ and $F_M(x,y,c)$ is an available input image field temporally adjacent to $F_{Sx}(x,y,c)$.

18. A non-transitory computer-readable medium storing computer readable instructions that, when executed by a computer, cause the computer to execute a method comprising:
   detecting a first level of spatial frequency sensitivity;
   detecting a second level of spatial frequency sensitivity, the second level of spatial frequency sensitivity being of greater sensitivity than the first level of spatial frequency sensitivity so that the step of detecting a second level of spatial frequency can detect smaller amounts of motion than the step of detecting a first level of spatial frequency; and
   selecting contributions from at least one of a first conversion process and a second conversion process for a given point in an image dependant upon whether motion is detected in the step of detecting a first level of spatial frequency or not, wherein
   the step of selecting contributions operates independently of the step of detecting a second level of spatial frequency if a degree of motion within the image or a part thereof including the given point detected by the step of detecting a first level of spatial frequency does not exceed a threshold amount.

19. A non-transitory computer-readable medium storing computer readable instructions that, when executed by a computer, cause the computer to execute a method comprising:
   detecting motion in an image segment with a first level of spatial frequency sensitivity;
   detecting motion in the image segment with a second level of spatial frequency sensitivity if a degree of motion detected in the image segment in the step of detecting motion in an image segment with a first level of spatial frequency exceeds a threshold value; and
   selecting contributions from at least one of a first conversion process and a second conversion process for a given point in the image segment dependent upon whether motion is detected in the step of detecting motion in an image segment with a first level of spatial frequency at the given point or not.

* * * * *